Figure 1:
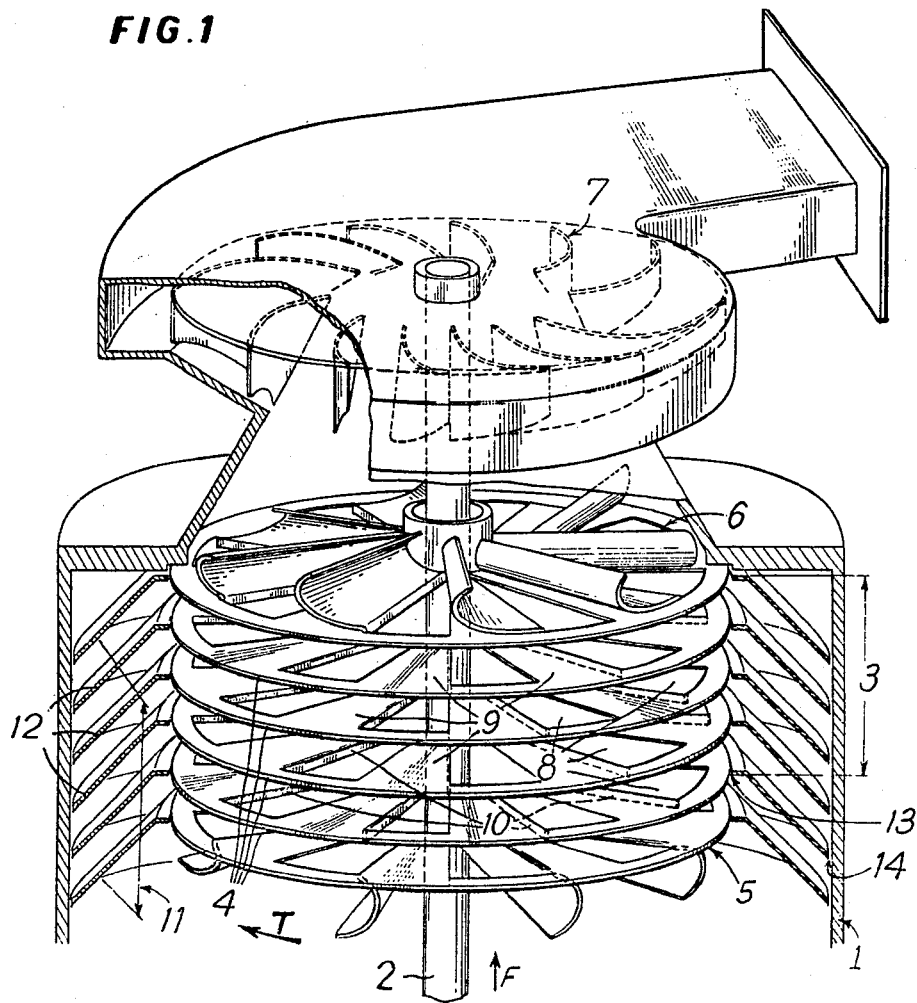

United States Patent [19]

Saget

[11] Patent Number: 4,460,393
[45] Date of Patent: Jul. 17, 1984

[54] APPARATUS FOR CENTRIFUGAL SEPARATION OF A MIXTURE CONTAINING AT LEAST ONE GASEOUS PHASE

[76] Inventor: Pierre Saget, 36 Avenue de la Grande Armée, Paris, France, 75017

[21] Appl. No.: 471,815

[22] Filed: Mar. 3, 1983

[30] Foreign Application Priority Data

Mar. 3, 1982 [FR] France ............................... 82 03532

[51] Int. Cl.³ .............................................. B01D 21/26
[52] U.S. Cl. ..................................... 55/406; 210/787; 209/144
[58] Field of Search ................. 55/406, 401, 408; 210/787; 209/144

[56] References Cited

U.S. PATENT DOCUMENTS 2,244,165  6/1941  MacFarland et al. ................ 55/408
4,361,490  11/1982  Saget ..................................... 55/406

*Primary Examiner*—Bernard Nozick

[57] ABSTRACT

Improved apparatus of the type comprising inside a fixed enclosure, a rotary assembly constituted by a treatment rotor with apertured discs angularly offset one with respect to the other, upstream by a rotary distributor and downstream by a fan with optional interposition of a rotary rectifier.

According to the invention, the apparatus comprises between the discs and the fixed part of the enclosure, means to partly at least annihilate the downstream leaks through the annular opening necessarily provided between the discs and the fixed part to allow the rotation of the rotary assembly. More particularly, said fixed part is constituted by a stack of truncated deflector plates which extend the discs, and on the edges of which are formed small blades constituting the leaks annihilating means.

6 Claims, 13 Drawing Figures

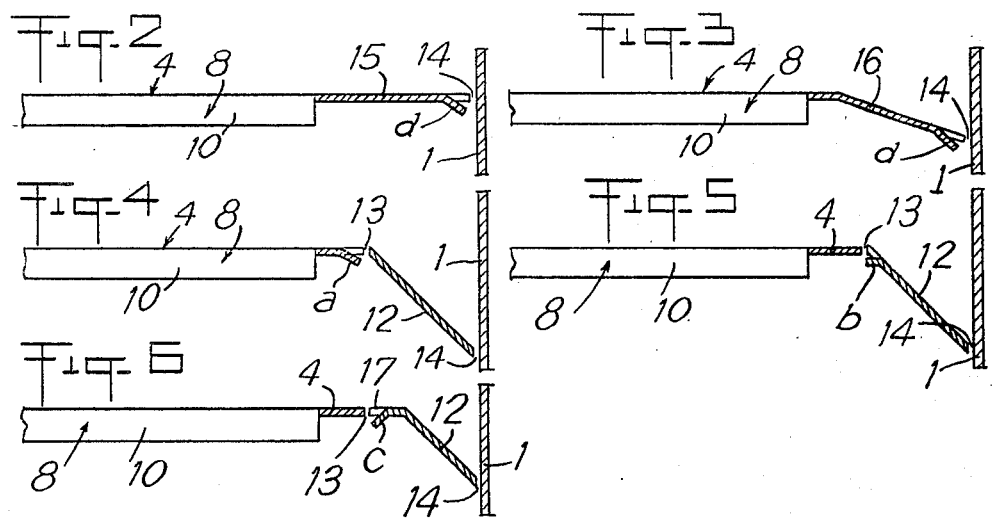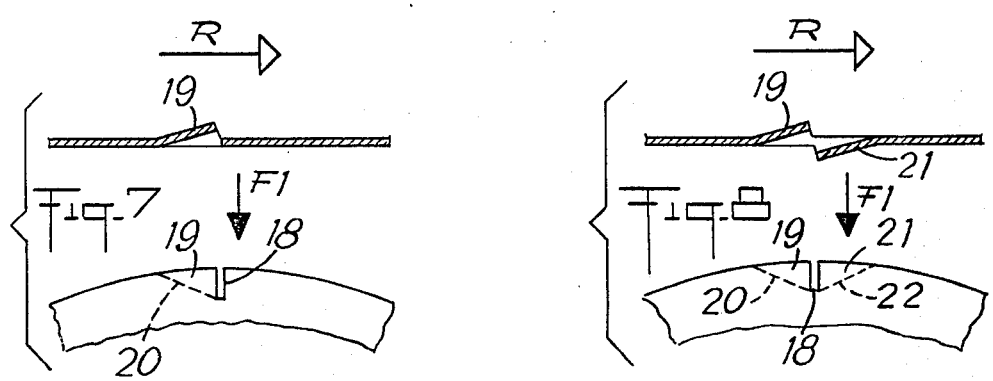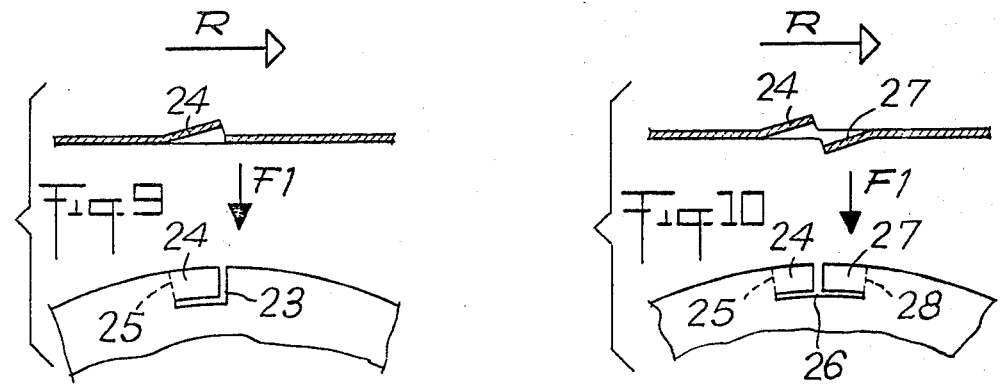

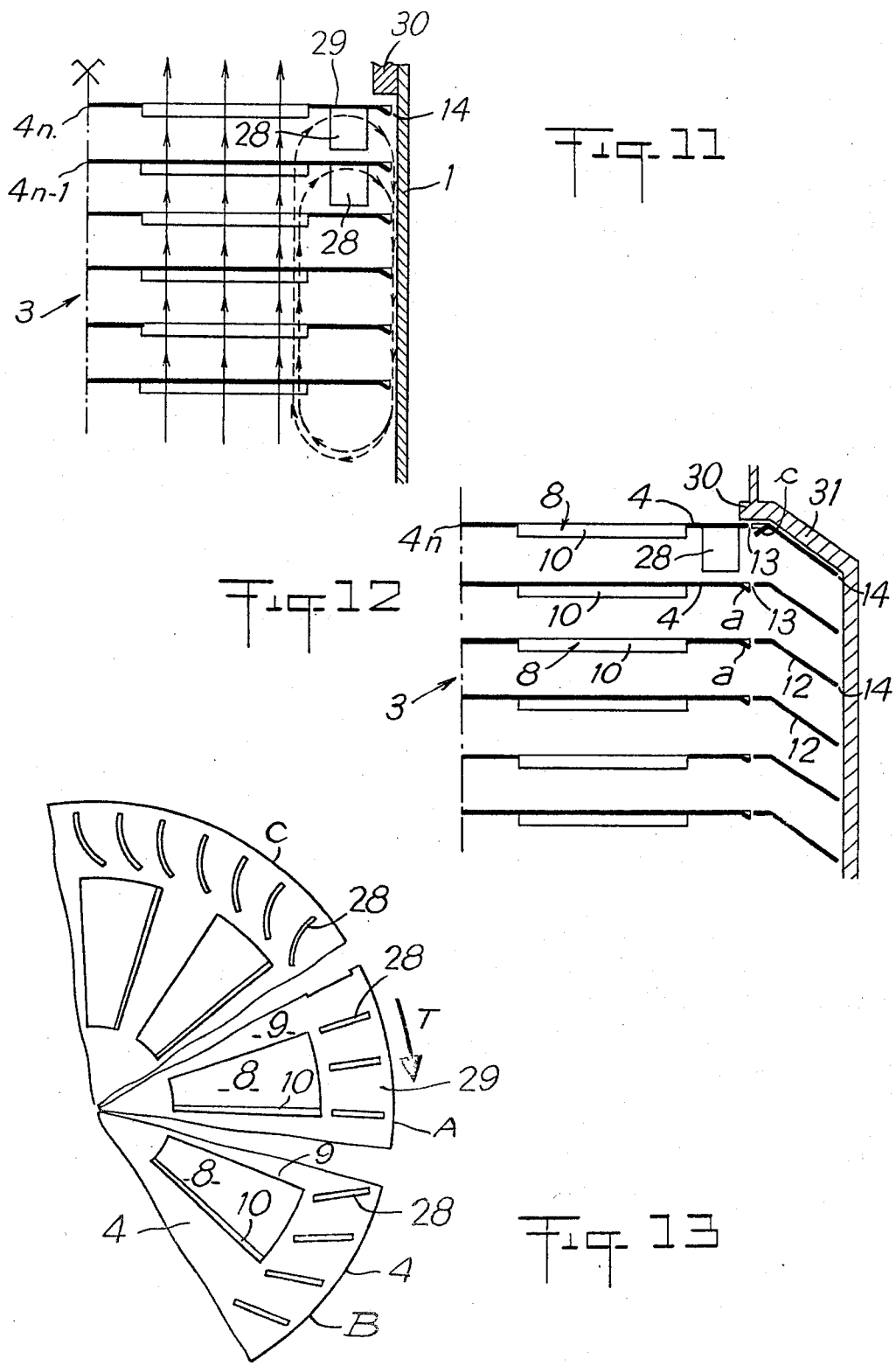

APPARATUS FOR CENTRIFUGAL SEPARATION OF A MIXTURE CONTAINING AT LEAST ONE GASEOUS PHASE

The present invention relates to improvements in an apparatus for the centrifugal separation of a mixture with at least one gaseous phase, said apparatus being described in French patent application No. 2 468 410.

Said apparatus is of the type comprising inside a fixed enclosure, a rotary assembly constituted by a treatment rotor with apertured discs angularly offset one with respect to the other, upstream by a rotary distributor and downstream by a fan with optional interposition of a rotary rectifier. The mixture to be treated flows in laminar style through the apertures of the discs in helical running stream separated by helical still layers, the still layers turning at the same speed as the rotor, whereas the running streams turn much faster. The gaseous phase to be separated is removed under the effect of the extremely long centrifugal field of the running streams and is caught by the still layers, where there is always a centrifugal field, although a lesser one. Under the effect of that field, the heavy phase moves towards the periphery and is trapped by a stack of truncated deflector plates diverging upstream and integral with the fixed enclosure.

The pressure, upstream of each disc, is greater than the pressure downstream, due to the loss of load and to expansion upon passage of the gaseous fluid through the apertures of the disc in question. Between said disc and the corresponding deflector plate is provided a functional clearance, which clearance reveals the presence of an annular opening through which a leak tends to occur from upstream towards downstream, due precisely to the aforesaid small drops of pressure. In like manner, a clearance is provided between the deflector plate in question and the wall of the enclosure for the heavy separated phase to be removed upstream, a leak of gaseous phase tending also to occur through said second annular opening, from upstream to downstream.

Said leaks interfere with separation output, since the gaseous phase obviously collects on its way, a quantity, small it is true, of the heavy phase brought by the intermediate still layers, but nevertheless a quantity which is incompatible with the quality required. Moreover, if said heavy phase is a liquid, the upstream flow of said liquid is opposed by the gas leak downstream and the liquid tends to dwell in the deflector plates; phenomena of re-routing of the liquid can then be observed.

It is the object of the present invention to overcome the aforesaid disadvantages in order to obtain exceptional performances and a separating efficiency approaching perfection.

This object is reached according to the invention with means to annihilate at least partly the downstream leaks through the annular opening necessarily provided between the discs and the fixed part to allow the rotation of the rotary assembly; which means consist in small axial vanes formed on the periphery of any one at least of the elements constituted by the discs and by the fixed part of the enclosure to generate an axial screen of fluid flowing backwards towards the upstream part through said annular opening, the screen then making it so that the mixture is entirely treated and that the separated heavy phase moves upstream along the wall of the enclosure.

The fixed part of the enclosure being constituted by the actual wall of the enclosure, the small vanes can be formed on the periphery of an annular aperture-free area of the discs over a large enough width and oriented so as to direct the sweeping screen upstream.

The said fixed part of the enclosure being constituted by a stack of truncated deflector plates whose inner edge is situated just opposite the discs, the small vanes can be formed on the edge of said discs or on the edge of the deflector plates, which edge may be either truncated, or annular or flat.

The means to partly at least annihilate the leak can also consist in radial or incidental straight or incurved blades, which project on to the upstream face of the aperture-face peripheral annular area of at least the last downstream disc of the rotor, to generate a radial screen of fluid flowing towards the wall of the enclosure, and the annular openings are barred above the last downstream disc, by a flange integral with the wall of the enclosure, said flange forming labyrinth and aiding to deviate the radial sweeping screen along said wall.

The invention will be more readily understood on reading the following description with reference to the accompanying drawings, in which:

FIG. 1 is a perspective view showing the centrifugal apparatus to which the improvements according to the invention can be applied, FIGS. 2 to 6 are diagrammatical cross-sections of a disc illustrating two possible embodiments and variants of the improvements according to the invention, FIGS. 7 to 10 are plan and cross-sectional views of several embodiments of the small vanes used according to FIGS. 3 to 6, FIGS. 11 and 12 are half-views of axial sections of the apparatus illustrating a third possible embodiment of the improvements according to the invention, FIG. 13 is a partial plan view of a disc showing several embodiments of the blades shown in FIGS. 11 and 12.

Referring first to FIG. 1, this shows that the apparatus, before improvements, comprises a fixed enclosure 1 in which is placed a rotary assembly which is driven in rotation by a driving member such as an electric motor.

Said assembly comprises, fixed on the same driving shaft 2:
- a treatment rotor 3 constituted by a stack of apertured discs 4,
- a rotary distributor 5 situated upstream of the rotor with respect to the axial flowing direction F followed by the mixture to be treated,
- optionally, a rotary rectifier 6 placed downstream of the rotor,
- and a fan 7 fixed on the shaft 1 downstream of said rectifier 6.

The discs 4 of the rotor 2 define apertures 8 separated by solid parts 9 with raised edges 10 which, with respect to the direction T of rotation, are called back edges. The discs are separated and angularly offset one from the other so as to determine the gradient of the helical flow of the running streams of mixture through the apertures 8; this flow of greater tangential speed than the rotor is due to a drop in the pressure upstream generated by the fan 7 and to its transformation by the distributor 5 into helical speed. The running streams flow faster relatively to intermediate still layers trapped in the rotor by the solid parts 9 and their raised edges 10.

The enclosure 1 is integral with a stack 11 of truncated deflector plates 12 which trap the separated heavy phase escaping from the running streams, either directly or via the still layers under the effect of the centrifugal fields to which the said streams and plates are subjected.

And as indicated hereinabove, clearances are provided:

between the discs 4 and the deflector plates 12 to allow the rotation of the rotary assembly, said clearance being reduced to a minimum by placing said discs and plates one in exact extension of the other, between the deflecting plates 12 and the wall of the enclosure 1 to allow the removal upstream against the latter, of the separated heavy phase.

Said clearances therefore cause the appearance of two annular openings 13 and 14 through which leaks can occur in a downstream direction, carrying with them small quantities of that heavy phase. And the object is to use means to oppose these leaks and consequently to achieve a virtually perfect separation.

According to a first embodiment, diagrammatically illustrated in FIGS. 4 to 6, said stack of truncated deflector plates 12 are used as well as the annular openings 13 and 14. Small vanes, called axial vanes, are provided to generate through the aligned openings 13, an axial screen of fluid flowing backwards in the upstream direction. Accordingly, the axial screen opposes any leaks which could occur through the openings 13; said screen is also relatively difficult for the lighter phase to cross, whereas the heavy phase pushed by the centrifugal field goes through relatively easily; said screen also helps the heavy phase to flow upstream along the wall of the enclosure.

Letters have been used as references to define the small vanes positionwise, and numbers to define them embodimentwise; the reason for this being that any type of vanes can be used in any type of case.

In the embodiment illustrated in FIG. 4 small vanes "a" are formed on the outer edge of the discs 4.

In that illustrated in FIG. 5, small vanes "b" are formed on the inner edge of the truncated deflector plates 12.

And in that illustrated in FIG. 6, small vanes "c" are formed on the inner edge of an annular flat flange 17 integral with each deflector plate 12 and extending exactly from the corresponding disc 4.

In a second embodiment, illustrated in FIGS. 2 and 3, there is no opening 13, and each disc is extended by a peripheral annular area, which is either coplanar 15, or truncated 16, and defines with the wall of enclosure 1, the opening 14, and an axial screen of fluid flowing backwards in the upstream direction is generated therethrough; to this effect, small vanes "d" are formed on the periphery of area 15 or 16.

All these small vanes "a" to "d" are oriented with respect to the element turning fastest (i.e. the support of said vanes or the fluid) in order to direct the sweeping screen upstream as with an axial fan.

The small vanes can be produced by any known means. They can for example, be perfectly profiled if the fixed deflector plates, or even the discs are produced by injecting into a mold a plastic material, or a light alloy, or the like. But since accuracy of shape is not imperative, and since the discs and deflector plates are virtually always made from sheet metal, the embodiments illustrated in FIGS. 7 to 10 can be carried out.

According to the embodiment illustrated in FIG. 7, a notch 18 is made by sawing, cutting, shearing or like method on the edge of the element supporting the small vanes (disc or deflector plate) and one of the corners 19 is lifted askew by folding along an oblique line 20. Said triangular corner constitutes a small vane adapted to push the fluid backwards in the upstream direction (arrow F1) when the supporting element moves in the direction of arrow R with respect to a static fluid or to a fluid turning less rapidly, or when the fluid flows in reverse to arrow R with respect to a fixed supporting element.

According to the embodiment illustrated in FIG. 8, the notch 8 permits to form two triangular corners or small vanes 19 and 21, by folding along oblique lines 20 and 22 respectively, one in the downstream direction and the other in the upstream direction.

According to the embodiment illustrated in FIG. 9, a right-angled notch 23 is made in the edge of the supporting element, and the resulting substantially rectangular lug 23 is lifted and folded along line 25. Said lug constitutes a small vane which can push the fluid back as in the preceding example.

According to the embodiment illustrated in FIG. 10, a T-shaped notch 26 is made in order to form two of the aforesaid lugs 24 and 27, by folding along lines 25 and 28 respectively, one in the downstream direction, and the other in the upstream direction.

It is important in all these embodiments, to bend the corners or lugs forming vanes with respect to the axial direction so that the element carrying them works in the area which corresponds to an opening just as in an axial fan.

According to a third embodiment illustrated in FIGS. 11 to 13, the last downstream disc 4.n of the rotor 3 (FIG. 12) or the last two downstream discs 4.n-1 and 4.n of said rotor (FIG. 11) are equipped with radial blades 28. These are integral with the outer annular edge 29 of the disc or discs in question surrounding the apertures 8. Said blades project onto the upstream face and extend from the disc with which they are fast, reaching close to the preceding disc.

If the apparatus is not equipped with deflector plates 12 (FIG. 11), the discs 4 of the rotor 3 extend so as to reach close to the wall of the enclosure 1, to define the opening 14 close to where the small blades 28 are situated. Said blades which are borne by the rim 29 of the discs 4.n and 4.n-1 behave like a radial fan and generate, when the rotor 3 turns, a radial screen of fluid flowing as far as the wall of the enclosure. For this screen to be deviated upstream along the said wall and never to use the last downstream opening 14, the said enclosure wall is integral with a flange 30 covering said opening from a small distance, so as to form a labyrinth. Said screen which, first of all, is radial, then axially deviated upstream, contains the heavy phase to be eliminated and carries same through the successive openings 14 as far as the apparatus outlet. But once it has reached the first disc upstream, the lighter phase of the screen returns into the central stream of the apparatus where it picks up another quantity of said heavy phase. When reaching the downstream disc or discs, said lighter phase forms a running screen which is pushed back towards the periphery of the radial fan 28, and the cycle is repeated.

If the apparatus comprises truncated deflector plates 12, the last disc downstream 4.n of the rotor 3 is equipped with radial blades 28 in order to form a radial fan which then generates a radial screen of fluid. Then, the radial screen must be deviated axially upstream, this being helped by the downstream deflector plate 12, although the annular openings 13 and 14 should not constitute privileged passages. On the contrary, in order that these openings do not let any screen of fluid through, said openings are concealed, in the manner of a labyrinth, by a conical extension 31 of the enclosure wall (for opening 14) and by the flange 30 of said wall (for opening 13). Regardless of what embodiment is selected, the blades 28 can be radial as indicated in part A of FIG. 13 or show an angle of incidence with respect to the radius, as indicated in part B of said Figure; said blades can be straight (parts A and B) or incurved (part C).

In this third embodiment of the invention, the apparatus is equipped with radial blades 28 on at least the last downstream disc 4.n of the rotor 3, and with small axial vanes a, b or c on some at least of the discs 4 and deflector plates 12, if any. The combination of radial blades with small axial vanes permits to obtain a helico-centrifugal fan effect due to which the openings 13 and/or 14 can only be traversed by one screen of fluid conveying the heavy phase upstream.

The invention is in no way limited to the description given hereinabove and on the contrary covers any variants which can be brought thereto without departing from the scope thereof.

What is claimed is:

1. Improved apparatus for the centrifugal separation of a mixture containing at least one gaseous phase, of the type comprising inside a fixed enclosure, a rotary assembly constituted by a treatment rotor with apertured discs angularly offset one with respect to the other, upstream by a rotary distributor and downstream by a fan with optional interposition of a rotary rectifier, the mixture to be treated flowing in laminar style through the apertures of the discs in helical running streams separated by helical still layers, in which the non-gaseous phase to be separated moves on between the discs as far as the fixed part of the enclosure where it is picked up and moved upstream, wherein the means to annihilate at least partly the downstream leaks through the annular opening necessarily provided between the discs and the fixed part to allow the rotation of the rotary assembly are constituted by small axial blades formed on the periphery of any one at least of the elements constituted by the discs and by the fixed part of the enclosure to generate an axial screen of fluid flowing backwards towards the upstream part through said annular opening, the screen then making it so that the mixture is entirely treated and that the separated heavy phase moves upstream along the wall of the enclosure.

2. Improved apparatus as claimed in claim 1, wherein the said fixed part of the enclosure being constituted by the actual wall of the enclosure, the small vanes are formed on the periphery of an annular aperture-free area of the discs over a large enough width and oriented so as to direct the sweeping screen upstream.

3. Improved apparatus as claimed in claim 1, wherein the said fixed part of the enclosure being constituted by a stack of truncated deflector plate whose inner edge is situated just opposite the discs, the small vanes are formed on the edge of said discs.

4. Improved apparatus as claimed in claim 1, wherein the means to at least partly annihilate the leaks also consist in radial or incident blades which are straight or incurved and project on to the upstream face of the peripheral annular aperture-free area of at least the last downstream disc of the rotor, in order to generate a radial screen of fluid flowing towards the wall of the enclosure, the annular openings being barred above the last downstream disc, by a flange integral with said wall, and said flange forming labyrinth and helping to deviate the radial sweeping screen axially along said wall.

5. Improved apparatus as claimed in claim 1, wherein the said fixed part of the enclosure being constituted by a stack of truncated deflector plates whose inner edge is situated just opposite the discs, the small vanes are formed on the edge of said deflectors.

6. Improved apparatus as claimed in claim 5, wherein the truncated body of the deflector plates is fast with a flat annular internal flange extending from the discs and in which are formed the small vanes.

* * * * *